(12) United States Patent
Wang et al.

(10) Patent No.: US 8,101,257 B2
(45) Date of Patent: Jan. 24, 2012

(54) ABRASION-RESISTANT TRANSFER PRINTING STRUCTURE

(75) Inventors: Shun-Cheng Wang, Taoyuan County (TW); Shih-Min Huang, Taipei (TW); Wen-Jung Chen, Kaohsiung (TW); Chih-Yuan Liao, Hsinchu County (TW)

(73) Assignee: SiPix Chemical Inc., Jhongli, Taoyuan County (TW)

( * ) Notice: Subject to any disclaimer, the term of this patent is extended or adjusted under 35 U.S.C. 154(b) by 504 days.

(21) Appl. No.: 12/341,229

(22) Filed: Dec. 22, 2008

(65) Prior Publication Data

US 2010/0159216 A1    Jun. 24, 2010

(51) Int. Cl.
*B32B 9/00* (2006.01)
*B32B 33/00* (2006.01)

(52) U.S. Cl. ............ 428/40.1; 428/41.7; 428/42.1; 428/343; 428/354; 428/913; 428/913.3; 428/914

(58) Field of Classification Search ............ 428/40.1, 428/41.7, 42.1, 343, 354, 913, 913.3, 914
See application file for complete search history.

(56) References Cited

U.S. PATENT DOCUMENTS 7,588,812 B1 * 9/2009 Patel et al. .............. 428/40.1
2007/0166536 A1 * 7/2007 Dollase et al. ............ 428/343

\* cited by examiner

*Primary Examiner* — Betelhem Shewareged
(74) *Attorney, Agent, or Firm* — Muncy, Geissler, Olds & Lowe, PLLC

(57) ABSTRACT

An abrasion-resistant transfer printing structure to transfer patterns and texts to a targeted object surface by press printing includes a hardened protecting layer and a release base layer. The hardened protection layer includes a first surface and a second surface. The first surface allows a transfer printing glue to be bonded to the targeted object to cover at least an area corresponding to the patterns and texts. The release base layer is located on the second surface of the hardened protection layer by a releasable manner and can be separated from the hardened protection layer by applying a release force after the press printing process is finished. Thus the hardened protection layer is exposed to isolate the patterns and texts from in contact with the exterior. The surface of the targeted object also is abrasion resistant.

16 Claims, 2 Drawing Sheets

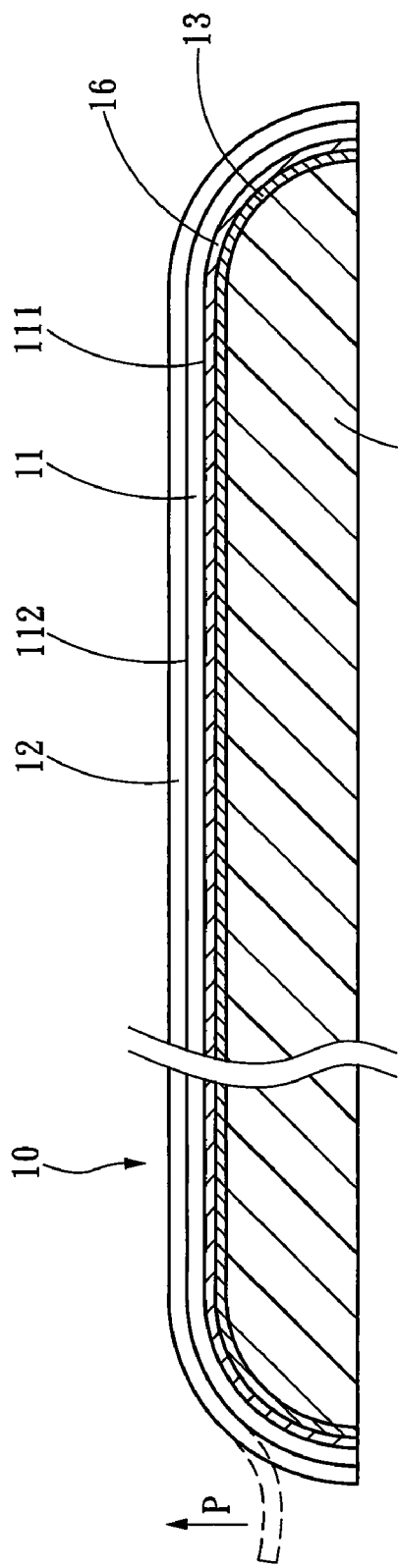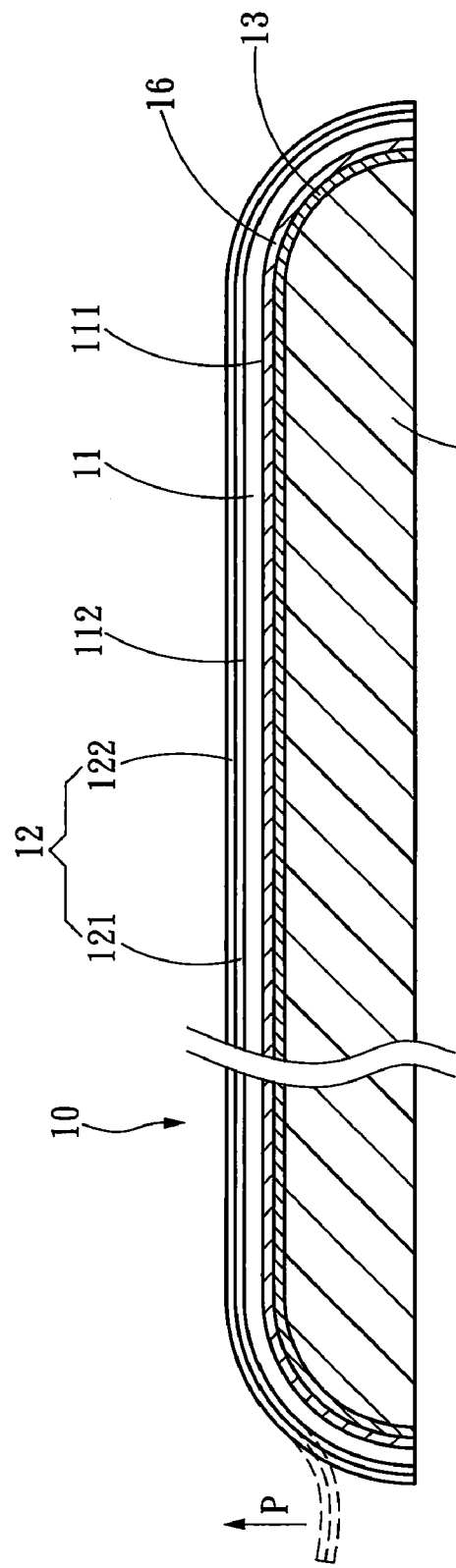

ABRASION-RESISTANT TRANSFER PRINTING STRUCTURE

FIELD OF THE INVENTION

The present invention relates to a transfer printing structure and particularly to an abrasion-resistant transfer printing structure.

BACKGROUND OF THE INVENTION

Transfer printing technique aims to transfer patterns and texts on a carrier film to a targeted object by pressure to generate appearance diversity of the object. Advance of technology makes transfer printing technique widely adopted on the surface of many types of material, such as metal, glass, plastics, ceramics and the like.

Among the transfer printing techniques, thermal transfer printing technique is most widely adopted. It adopts a principle by printing a pattern to be transferred on a heat-resistant base film, disposing the base film contained the pattern on the surface or location of a targeted object, and applying heat and pressure to transfer the pattern to the targeted object. In the conventional thermal transfer printing, the printing layer of the pattern is directly exposed outside after the transfer printing process is finished. As the printing layer is generally made from a soft material and easily chaps and peels off upon abrasion or impact with other articles. Hence the thermal transfer printing quality and life span are easily affected. To provide protection, the conventional approach is forming a protection film by spraying after the thermal transfer printing has been finished. However, spraying process not only creates environmental pollution also consumes a great amount of spraying material and results in a higher production cost.

To remedy the aforesaid drawbacks, an In-Mold Decoration (IMD) technique has been developed to form a desired pattern on the object surface. Its process includes disposing a film formed with a hardened layer and a decorative pattern in an injection mold, and injecting a thermal resin to one side of the film in an injection process so that the thermal resin and the film are bonded together in one body. While such a technique allows the decorative pattern to be covered by the hardened layer without directly exposed and damaged or scraped, applied to a cubical mold with a great curved angle chaps are prone to occur, and creases or air bubbles could be generated. Hence its applicability is limited.

SUMMARY OF THE INVENTION

The primary object of the present invention is to provide an abrasion-resistant transfer printing structure that is equipped with the protection feature for patterns and texts like the conventional thermal transfer printing process adopted IMD but overcomes the drawback of inapplicable to cubical products occurred to IMD. To achieve the foregoing object, the abrasion-resistant transfer printing structure according to the invention aims to transfer patterns and texts to the surface of a targeted object by press printing. It includes a hardened protection layer and a release base layer. The hardened protection layer has a first surface and a second surface. The first surface enables a transfer printing glue to be bonded to the targeted object to cover at least an area corresponding to the patterns and texts. The release base layer is located on the second surface of the hardened protection layer by a releasable manner and can be separated from the hardened protection layer by applying a release force after the press printing process is finished.

In one aspect, the hardened protection layer has a hardness and abrasion-resistance standard reaching F or higher based on pencil hardness test measurement of JIS K 5400, and produces no scraping traces by adopting a RCA standard of applying 175 g of pressure for at least 300 times, wherein ES refers to Japanese Industrial Standards which specifies the standards used for industrial activities in Japan, and the symbol K refers to the Chemical Engineering division in the technical area, and the 4-digit number 5400 refers to the place in the Chemical Engineering division. The standard JIS K 5400 bears its title as Testing methods for paints. In addition, the hardened protection layer is formed at a thickness between 3-100 μm, preferably between 4-30 μm.

In another aspect, the release base layer is integrally formed in one body containing a release material, or has a release film in contact with the second surface and a base film located on the release film. The release effective temperature is between 50° C.-300° C. The patterns and texts can be formed by an ink layer on the first surface of the hardened protection layer. The ink layer may be printed with ink of sublimation type, heat-transfer type or UV type. The ink layer may further include a photo mask layer, metal evaporation layer, sputtered layer or pearl luster material layer. The transfer printing glue has an activated temperature between 80° C.-250° C., and can be selected from various types of bonding materials, such as hot melt glue, UV glue, light activated glue, electronic beam activated glue and the like. It also may contain a leveling agent to get a smoother transfer printing structure.

In yet another aspect, the hardened protection layer is exposed after the release base layer is released to isolate the patterns and texts from in contact with the exterior and provide abrasion resistance for the surface of the targeted object. Thus the invention can resolve the pollution and material waste problems occurred to the conventional thermal transfer printing that adopts spraying process and overcome the limitation of IMD technique of inapplicable to cubical products.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 1 is an exploded view of an embodiment of the invention.

FIG. 2 is an exploded view of an embodiment of the release base layer of the invention formed in a composite base film.

DETAILED DESCRIPTION OF THE PREFERRED EMBODIMENTS

Figure 3:
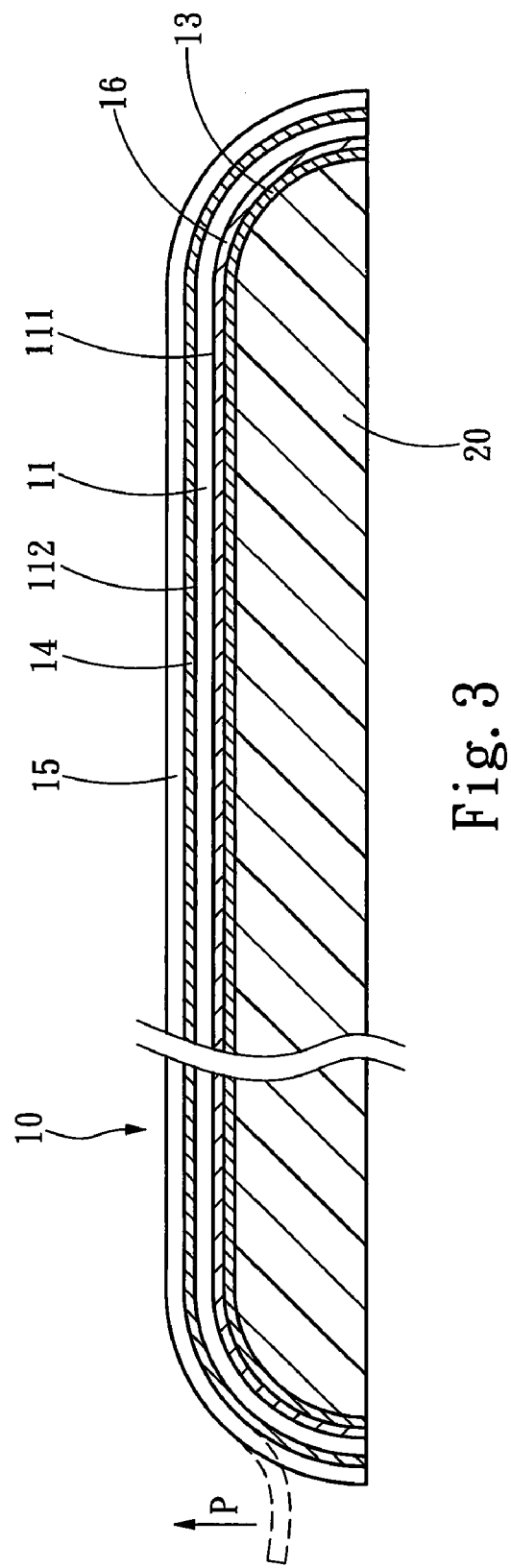
FIG. 3 is an exploded view of another embodiment of the invention.

Please refer to FIG. 1 for an embodiment of the invention. The abrasion-resistant transfer printing structure 10 according to the invention aims to transfer patterns and texts to the surface of a targeted object 20 by press printing. The targeted object 20 may be made from a wide variety of materials, such as polycarbonate (PC), acrylonitrile-butadiene-styrene (ABS), polymethylmethacrylate (PMMA), polyoxymethylene (POM), polybutylene terephthalate (PBT) and the like. The targeted object 20 may have a flat surface, or a surface inclined at an angle between at least 10°~90°. The transfer printing structure 10 includes at least a hardened protection layer 11 and a release base layer 12. The hardened protection layer 11 includes a first surface 111 and a second surface 112. The first surface 111 allows a transfer printing glue 13 to be bonded to the targeted object 20 to cover at least an area corresponding to the patterns and texts. The release base layer 12 is located on the second surface 112 of the hardened protection layer 11 by a releasable manner and can be separated from the hardened protection layer 11 by applying a release force P after the press printing process is finished.

The hardened protection layer 11 is formed at a thickness between 3-100 μm, preferably between 4-20 μm.

In order for the hardened protection layer 11 to provide a desired hardness and abrasion resistance to protect the patterns and texts, its hardness and abrasion-resistance standard reaches F or higher based on pencil hardness standard test measurement method of JIS K 5400, and no scraping traces are produced by adopting a RCA standard of applying 175 g of pressure for at least 300 times. The patterns and texts are formed on an ink layer 16 printed on the first layer 111 of the hardened protection layer 11. To achieve various types of presentation effect, the ink layer 16 may include a photo mask layer, metal evaporation layer, sputtered layer, pearl luster material layer or the like. The ink layer 16 may be printed with ink of a sublimation type, heat-transfer type or UV type.

The transfer printing glue 13 for bonding the hardened protection layer 11 on the surface of the targeted object 20 can be formed on the surface of the targeted object 20 or the first surface 111 of the hardened protection layer 11 according to different press printing processes. In this embodiment, the transfer printing glue 13 may be hot melt glue, UV glue, light activated glue, electronic beam activated glue or the like. When the transfer printing glue 13 is heated above an activated temperature, it has bonding property. The activated temperature is between 80° C.-250° C. To achieve a smoother transfer printing structure, a selected leveling agent may be added to the transfer printing glue 13.

In this embodiment, in order to bond the release base layer 12 to the hardened protection layer 11 in a releasable manner, a release material may be added to the release base layer 12 to enable the hardened protection layer 11 to get a release capability. The release base layer 12 may be a single layer made from one or more of the following polymers in combinations: polyethylene terephthalate (PET), polyethylene napthalate (PEN), polyethylene glycol-co-cyclohexane-1,4-dimethanol terephthalate, (PETG), thermalplastic polyurethane (TPU), polyurethane (PU), polypropylene (PP), polycarbonate (PC), amorphous polyethylene terephthalate (A-PET) and polyvinyl chloride (PVC). The release effective temperature is between 50° C.-300° C.

Refer to FIG. 2 for the release base layer 12. It is a composite base film consisting of a main base layer 121 and a sub-base layer 122. The main base layer 121 may be made from polyethylene terephthalate (PET), amorphous polyethylene terephthalate (A-PET) or polyethylene napthalate (PEN). The sub-base layer 122 may be made from polyethylene glycol-co-cyclohexane-1,4-dimethanol terephthalate (PETG), thermalplastic polyurethane (TPU), polyurethane (PU), polypropylene (PP), polycarbonate (PC), amorphous polyethylene terephthalate (A-PET), or polyvinyl chloride (PVC). The release effective temperature is between 50° C.-300° C.

In the invention, to equip the hardened protection layer 11 with release capability, aside from adding a release material in the release base layer 12 as previously discussed, another approach is forming a laminate structure by providing a release film 14 in contact with the second surface 112 and a base film 15 on the release film 14 as shown in FIG. 3. The base film 15 may be a single layer made from one or more of the following polymers in combinations: polyethylene terephthalate (PET), polyethylene napthalate (PEN), polyethylene glycol-co-cyclohexane-1,4-dimethanol terephthalate (PETG), thermalplastic polyurethane (TPU), polyurethane (PU), polypropylene (PP), polycarbonate (PC), amorphous polyethylene terephthalate (A-PET) and polyvinyl chloride (PVC). The release effective temperature is between 50° C.-300° C.

Figure 4:
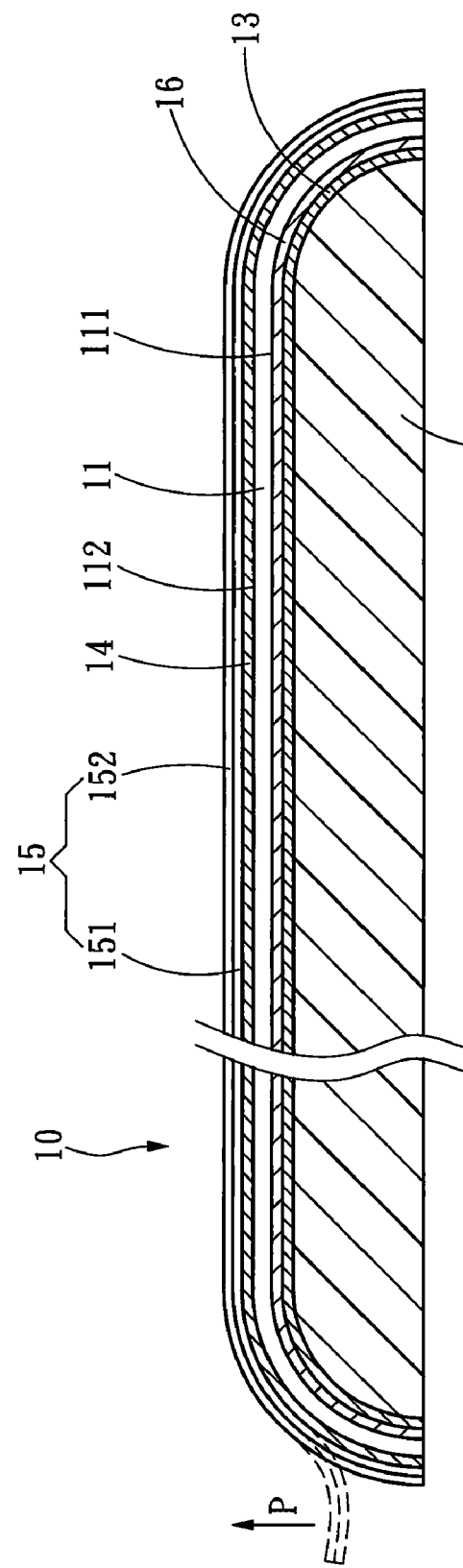
FIG. 4 is an exploded view of another embodiment of the release base layer of the invention formed in a composite base film.

Referring to FIG. 4, the base film 15 may also be a composite base film consisting of a main base layer 151 and a sub-base layer 152. The main base layer 151 may be made from polyethylene terephthalate (PET), amorphous polyethylene terephthalate (A-PET) or polyethylene napthalate (PEN). The sub-base layer 152 may be made from polyethylene glycol-co-cyclohexane-1,4-dimethanol terephthalate (PETG), thermalplastic polyurethane (TPU), polyurethane (PU), polypropylene (PP), polycarbonate (PC), amorphous polyethylene terephthalate (A-PET), or polyvinyl chloride (PVC). The release effective temperature is between 50° C.-300° C.

The transfer printing structure 10 of the invention thus made can bond transfer printing glue 13 to the target object 20. Through a wheel thermal or flat thermal press the transfer printing structure 10 can be bonded to the targeted object 20 through press printing. When in use, the release base layer 12 can be peeled off from the hardened protection layer 11 bonded to the targeted object 20 by applying a release force P. Then the hardened protection layer 11 is exposed to isolate the patterns and texts from in contact with the exterior. The surface of the targeted object 20 also is abrasion resistant.

As a conclusion, the abrasion-resistant transfer printing structure of the invention mainly includes a hardened protection layer and a release base layer. Compared with the conventional thermal transfer printing techniques, the patterns and texts on the targeted object are covered and protected by the hardened protection layer without chipping off by impact or abrasion of other articles. The pollution and waste caused by the conventional spraying process also can be avoided. Furthermore, the hardened protection layer is evenly bonded to the surface of the targeted object; hence the problem of forming creases or air bubbles that occurs to the conventional IMD technique because of greater cubical curved angles can also be overcome. Thus the invention provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An abrasion-resistant transfer printing structure for transferring patterns and texts to a targeted object surface by press printing, comprising:

a hardened protection layer including a first surface and a second surface, the first surface allowing a transfer printing glue to be bonded to the targeted object to cover at least a selected area matching the patterns and texts; and a release base layer which is located on the second surface of the hardened protection layer by a releasable manner and separable from the hardened protection layer through a release force after the press printing is finished;

wherein the hardened protection layer is exposed after the release base layer is separated to isolate the patterns and texts from in contact with exterior and provide abrasion resistance for the targeted object surface;

wherein the release base layer is integrally formed in one body and includes a release material; and wherein the release base layer is selected from the group consisting of polyethylene terephthalate, polyethylene napthalate, polyethylene glycol-co-cyclohexane-1,4-dimethanol terephthalate, thermalplastic polyurethane, polyurethane, polypropylene, polycarbonate, amorphous polyethylene terephthalate and polyvinyl chloride and combinations thereof.

2. The abrasion-resistant transfer printing structure of claim 1, wherein the hardened protection layer has a hardness of F or higher based on pencil hardness test measurement of JIS K 5400.

3. The abrasion-resistant transfer printing structure of claim 1, wherein the hardened protection layer produces no scraping traces by adopting a RCA standard of applying 175 g of pressure for at least 300 times.

4. The abrasion-resistant transfer printing structure of claim 1, wherein the hardened protection layer is formed at a thickness between 3-100 μm.

5. The abrasion-resistant transfer printing structure of claim 1, wherein the hardened protection layer is formed at a desired thickness between 4-30 μm.

6. The abrasion-resistant transfer printing structure of claim 1, wherein the transfer printing glue has an activated temperature between 80° C.-250° C.

7. The abrasion-resistant transfer printing structure of claim 1, wherein the transfer printing glue contains a leveling agent.

8. The abrasion-resistant transfer printing structure of claim 1, wherein the release base layer is a composite base film consisting of a main base layer and a sub-base layer, the main base layer being selected from the group consisting of polyethylene terephthalate, amorphous polyethylene terephthalate and polyethylene napthalate; the sub-base layer being selected from the group consisting of polyethylene glycol-co-cyclohexane-1,4-dimethanol terephthalate, thermalplastic polyurethane, polyurethane, polypropylene, polycarbonate, amorphous polyethylene terephthalate and polyvinyl chloride.

9. The abrasion-resistant transfer printing structure of claim 1, wherein an effective temperature of the releasable manner is between 50° C.-300° C.

10. The abrasion-resistant transfer printing structure of claim 1, wherein the transfer printing glue is selected from the group consisting of hot melt glue, UV glue, light activated glue and electronic beam activated glue and combinations thereof.

11. The abrasion-resistant transfer printing structure for transferring patterns and texts to a targeted object surface by press printing, comprising:

a hardened protection layer including a first surface and a second surface, the first surface allowing a transfer printing glue to be bonded to the targeted object to cover at least a selected area matching the patterns and texts; and a release base layer which is located on the second surface of the hardened protection layer by a releasable manner and separable from the hardened protection layer through a release force after the press printing is finished;

wherein the hardened protection layer is exposed after the release base layer is separated to isolate the patterns and texts from in contact with exterior and provide abrasion resistance for the targeted object surface;

wherein the release base layer has a release film in contact with the second surface and a base film located on the release film; and wherein the base film is selected from the group consisting of polyethylene terephthalate, polyethylene napthalate, polyethylene glycol-co-cyclohexane-1,4-dimethanol terephthalate, thermalplastic polyurethane, polyurethane, polypropylene, polycarbonate, amorphous polyethylene terephthalate and polyvinyl chloride and combinations thereof.

12. The abrasion-resistant transfer printing structure of claim 11, wherein the base film is a composite base film consisting of a main base layer and a sub-base layer, the main base layer being selected from the group consisting of polyethylene terephthalate, amorphous polyethylene terephthalate and polyethylene napthalate; the sub-base layer being selected from the group consisting of polyethylene glycol-co-cyclohexane-1,4-dimethanol terephthalate, thermalplastic polyurethane, polyurethane, polypropylene, polycarbonate, amorphous polyethylene terephthalate and polyvinyl chloride.

13. The abrasion-resistant transfer printing structure of claim 11, wherein the effective temperature of the releasable manner is between 50° C.-300° C.

14. The abrasion-resistant transfer printing structure of claim 1, wherein the patterns and texts are formed on an ink layer located on the first surface of the hardened protection layer.

15. The abrasion-resistant transfer printing structure of claim 14, wherein the ink layer is formed by ink selected from the group consisting of ink of a sublimation type, a heat-transfer type and an UV type.

16. The abrasion-resistant transfer printing structure of claim 14, wherein the ink layer selectively further includes a photo mask layer, a metal evaporation layer, a sputtered layer or a pearl luster material layer.

* * * * *